Figure 1:
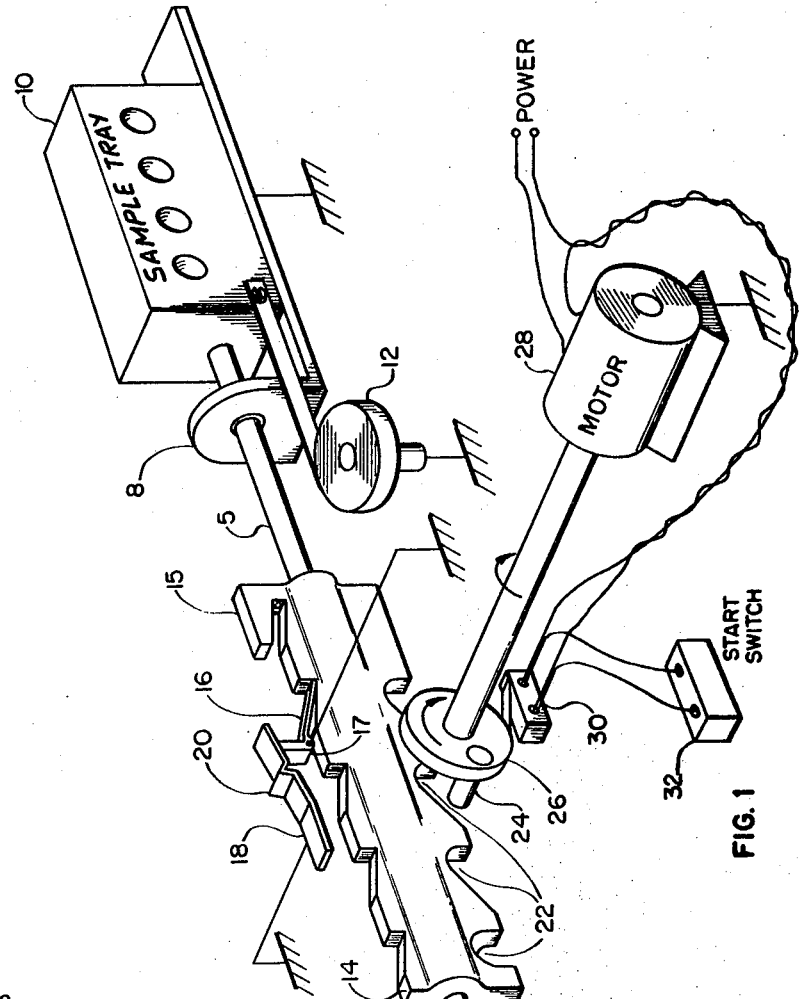

United States Patent
Van Slooten

[15] 3,655,020
[45] Apr. 11, 1972

[54] MECHANICAL POSITIONING DEVICE FOR PRECISELY DETERMINING A SERIES OF MECHANICAL LOCATIONS

[72] Inventor: Nico J. Van Slooten, Chino, Calif.
[73] Assignee: Beckman Instruments, Inc.
[22] Filed: Dec. 10, 1970
[21] Appl. No.: 96,830

[52] U.S. Cl. .............................. 192/142 R, 74/84, 74/116, 74/422, 74/436, 192/143
[51] Int. Cl. ..................................F16d 71/00, F16h 27/04
[58] Field of Search....................192/142 R, 143; 74/84, 111, 74/116, 117, 415, 422, 436

[56] References Cited

UNITED STATES PATENTS

| | | | |
|---|---|---|---|
| 370,705 | 9/1887 | Koch......................................74/116 X |
| 1,483,665 | 2/1924 | Klasing....................................74/111 |
| 1,788,729 | 1/1931 | Meier.......................................74/116 X |
| 2,307,886 | 1/1943 | Hansson..................................74/415 X |
| 2,746,718 | 5/1956 | French.....................................74/116 X |

Primary Examiner—Allan D. Herrmann
Attorney—Paul R. Harder and Robert J. Steinmeyer

[57] ABSTRACT

A movable body member having a series of ratchet teeth is intermittently coupled to a driving force which moves the body member. A ratchet arm is precisely mounted adjacent the series of ratchet teeth to engage the series of teeth when the body member is decoupled from the driving force. A restoring force is applied to the body member to press the ratchet arm firmly against each ratchet tooth with which it comes in contact, thereby precisely locating the body member in a series of mechanical positions. A ratchet spring forces the ratchet arm to engage each tooth of the series of ratchet teeth as each tooth moves adjacent to the arm. A device is provided for restraining the ratchet arm from engaging the ratchet teeth after the last tooth in the series of ratchet teeth is passed. The ratchet arm is restrained until the body member is returned by the restoring force to an initial position where the ratchet arm is released from the restraint and engaged with the ratchet teeth whereby the series of mechanical movements may be repeated.

9 Claims, 2 Drawing Figures

PATENTED APR 11 1972 3,655,020

INVENTOR.
NICO J. VAN SLOOTEN
BY
Paul R Harder
ATTORNEY

MECHANICAL POSITIONING DEVICE FOR PRECISELY DETERMINING A SERIES OF MECHANICAL LOCATIONS

The present invention relates to a precision mechanical positioning device and more particularly to a mechanical mechanism for precisely locating each of a multiplicity of samples for analysis in a radiant energy analyzer.

In the field of spectrophotometry, it has been the general practice to employ both manual and automatic methods to insert and remove samples being analyzed.

Although manual methods have served the purpose, they have not proved entirely satisfactory under all conditions of service for the reasons that considerable difficulty has been experienced in obtaining qualified technical personnel, in obtaining more complete data and in freeing experienced personnel from more creative work.

One of the most critical problems confronting designers of automatic spectrophotometers has been the precision positioning of sample cells in the light beam of the instrument. Slight variations in the mechanical position of the sample cell may produce variations in light transmission which significantly effect the instrument indication thereby producing intolerable errors. Prior art mechanisms have utilized large precision cams or precision gear trains to provide accurate positioning. These mechanisms have required a multiplicity of precision elements which has resulted in undue cost and complexity. These problems have been overcome by the present invention.

The general purpose of this invention is to provide a precision positioning mechanism which embraces all the advantages of similarly employed sample cell changing and locating devices and possesses none of the aforedescribed disadvantages. To attain this, the present invention contemplates a ratchet and ratchet body arrangement in the sample changing apparatus of a spectrophotometer whereby high cost and complexity of precision mechanical elements are avoided.

An object of the present invention is the provision of a mechanical positioning device for precisely determining a series of mechanical locations.

Another object is to provide a ratchet body which engages an accurately positioned ratchet arm whereby the ratchet body is precisely located in a series of sequential positions.

A further object of the invention is the provision of a ratchet restraint to prevent the ratchet from engaging the ratchet body while the ratchet body is returned to its initial position after completing its sequence of precision movements.

Still another object is to provide a ratchet body which releases the ratchet from the ratchet restraint when the ratchet body has returned to its initial position thereby allowing the ratchet to again engage the ratchet body to repeat the sequence of precision movements.

Figure 2:
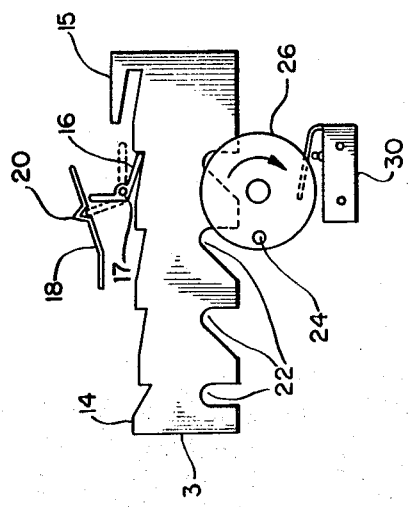

Other objects and many of the attendant advantages of this invention will be readily appreciated as the same becomes better understood by reference to the following detailed description when considered in connection with the accompanying drawing in which like reference numerals designate like parts throughout the figures thereof and wherein:

FIG. 1 illustrates a combination of a pictorial view and mechanical block diagram of a preferred embodiment of the invention; and, FIG. 2 illustrates a side elevation of the ratchet body, ratchet arm, ratchet spring, disc drive and microswitch combination as utilized in a preferred embodiment of the invention.

Turning now to FIG. 1, a ratchet body or movable body member 3 is connected to a mechanical linkage such as rods 4 and 5 which rods are connected respectively to the ends of body member 3. Rod 4 slides through a sleeve bearing in fixed frame member 6 and rod 5 slides through a sleeve bearing in fixed frame member 8. Rod 5 is further connected to sample tray 10 which slides on a flat surface of frame member 8. Sample tray 10 is further connected to negator spring 12.

Body member 3 has disposed on a surface thereof a series of ratchet teeth each defining a precise location on the body member. A last tooth 14 is essentially larger than the other teeth and a first tooth of the series has a projecting finger 15. A ratchet arm 16 is pivotally mounted at elbow 17 adjacent to the series of ratchet teeth whereby one end of the ratchet arm is aligned to engage a tooth of the series of ratchet teeth as the body member is moved adjacent to the ratchet arm. A ratchet spring 18 having detent 20 biases the ratchet arm in a first position whereby the ratchet arm is forced to engage each ratchet tooth as the body member moves with respect to the ratchet arm. When detent 20 captures and holds the ratchet arm, the arm is maintained in a second position whereby it is restrained from engaging the ratchet teeth on body member 3.

Body member 3 further has notches 22 disposed along a second surface which are periodically engaged by a protruding finger or driving pin 24 connected to rotating disc 26 which in turn is driven by motor 28. Driving pin 24 also intermittently engages a normally closed microswitch 30 once every revolution to remove power from the motor thereby stopping rotating disc 26. Starting switch 32 is connected in parallel with switch 30.

Operation of the present invention can best be described by reference to FIG. 2. As rotating disc 26 makes one revolution, driving pin 24 engages one of the notches 22 and moves the body member 3 in the direction indicated by the advance arrow illustrated in FIG. 1. As driving pin 24 decouples from one of the notches 22, it engages microswitch 30 and removes power from the motor to stop the rotation of disc 26. Negator spring 12 of FIG. 1 supplies a restoring or biasing force which tends to move the body in the direction indicated by the return arrow and oppose the motion produced by the rotating disc 26 and driving pin 24. Ratchet arm 16 engages a ratchet tooth of body member 3 to prevent the restoring force from moving the body member 3 in the direction of the return arrow after the driving pin 24 decouples from one of the notches 22. Ratchet spring 18 applies pressure against ratchet arm 16 to ensure the engagement of the ratchet arm with the ratchet teeth. The restoring force supplied by negator spring 12 of FIG. 1 forces the tooth engaged by the ratchet arm firmly against the arm to precisely locate body member 3. Body member 3 is moved sequentially in the direction of the advance arrow with the ratchet arm 16 engaging each ratchet tooth of body member 3 in sequence and in the manner described above. Each movement is initiated by start switch 32 applying power to the motor 28. Switch 32 may be manually operated or programmed automatically to provide a wide variety of body movement sequences. Although four body positions are illustrated in the drawing, it should be clear that any number may be obtained by providing an appropriate number of notches and ratchet teeth on body member 3.

Body member 3 moves in the direction of the advance arrow illustrated in FIG. 1 until the last tooth 14 which is larger than the other ratchet teeth engages ratchet arm 16 forcing the arm to be captured and restrained by detent 20 in ratchet spring 18. Since in this restrained position ratchet arm 16 cannot engage the ratchet teeth of body member 3, there is nothing to prevent the restoring force of negator spring 12 of FIG. 1 to move body member 3 in the direction of the return arrow back to its initial starting position. Body member 3 moves rapidly in response to the force provided by negator spring 12 until finger 15 engages and rotates ratchet arm 16 about elbow 17 in a direction to release the arm from detent 20 and allow the arm again to engage the ratchet teeth for repeating the series of mechanical movements of body member 3.

It should be clear that the preferred embodiment of the present invention provides a series of precise mechanical positions which automatically and accurately can be obtained on a repetitive basis. Precise positioning is determined by a precisely located ratched arm sequentially engaging ratchet teeth precisely located on the body member to be positioned. A large tooth is provided to end the sequence of precision movements by forcing the ratchet arm to be restrained by a ratchet spring from further engaging the ratchet teeth. The body member is returned to its initial position by a restoring force where a protruding finger releases the ratchet arm from the ratchet spring and allows the ratchet arm again to engage the ratchet teeth to repeat the series of precision mechanical movements.

Although particular components have been discussed in connection with a specific embodiment of a radiant energy analyzer having a sample tray precisely located in accordance with the teachings of the present invention, others may be utilized. Furthermore, it will be understood that although an exemplary embodiment of the present invention has been disclosed and discussed, other applications and mechanical arrangements are possible and that the embodiments disclosed may be subjected to various changes, modifications and substitutions without necessarily departing from the spirit of the invention.

What is claimed is:

1. A mechanical positioning apparatus for determining a plurality of precise mechanical positions comprising:
    a movable body member having a series of ratchet teeth thereon, each of said teeth defining a precise mechanical location on said body member;
    restoring means for biasing said body member in a first direction;
    a ratchet arm precisely mounted adjacent said series of ratchet teeth, said arm having a first position for engaging said teeth to hold said body member in a precise mechanical position against the bias of said restoring means;
    ratchet spring means coupled to said ratchet arm and normally biasing said arm in said first position;
    drive means intermittently driving said body member in a direction opposite said first direction and against the bias of said restoring means, said body member being driven in steps to engage said ratchet arm in said first position with at least the next adjacent ratchet tooth whereby said body member is intermittently driven and held in a plurality of precisely defined positions;
    means on said body member adjacent the last ratchet tooth of said series of teeth for engaging and moving said ratchet arm to a second position out of engagement with said series of teeth upon the next intermittent movement of said body member from the position of said body member defined by said last ratchet tooth engaged by said ratchet arm;
    means holding said ratchet arm in said second position whereby said body member is moved in said first direction by said restoring means; and,
    means on said body member adjacent the first tooth of said series of teeth for engaging said ratchet arm and moving said arm from said second position to said first position to stop the motion of said body member in said first direction and to hold said body member until the next movement of said body member by said drive means whereby said plurality of precisely defined positions of said body member may be repeated.

2. The mechanical positioning apparatus defined in claim 1 wherein said drive means comprises:
    rotating means having a protruding finger, said finger intermittently engaging said body member as said rotating means rotates;
    an electric motor for driving said rotating means; and,
    a switch mounted adjacent to said rotating means for applying power to said motor, said switch being engaged by said projecting finger to remove power from said motor at the completion of each revolution of said rotating means.

3. The mechanical positioning apparatus defined in claim 2 wherein said restoring means is a mechanical spring.

4. The mechanical positioning apparatus defined in claim 3 further comprising a movable tray mechanically attached to said body member, said tray adapted to receive and hold items for precise mechanical positioning.

5. In a radiant energy analyzer, a mechanical mechanism for precisely locating each of a multiplicity of samples in a position for analysis, comprising:
    a movable sample tray into which a multiplicity of samples are inserted for analysis;
    a movable body member having a first surface upon which are disposed a series of ratchet teeth and a second surface upon which are disposed a series of notches, each of said ratchet teeth defining a precise mechanical location on said body member;
    means connecting said sample tray and body member;
    restoring means for biasing said body member in a first direction;
    a ratchet arm precisely mounted adjacent said series of ratchet teeth, said arm having a first position for engaging said teeth to hold said body member in a precise mechanical position against the bias of said restoring means;
    ratchet spring means coupled to said ratchet arm and normally biasing said arm in said first position;
    rotating means for intermittently moving said body member in a direction opposite said first direction and against the bias of said restoring means, said rotating means having a protruding finger for intermittently engaging said series of notches in said body member as said rotating means is rotated whereby said body member is moved in steps to engage said ratchet arm in said first position with at least the next adjacent ratchet tooth, said ratchet arm holding said body member in one of a plurality of precise mechanical positions when said protruding finger is out of engagement with said series of notches;
    means on said body member adjacent the last ratchet tooth of said series of teeth for engaging and moving said ratchet arm to a second position out of engagement with said series of teeth upon the next intermittent movement of said body member from the position of said body member defined by said last ratchet tooth engaged by said ratchet arm;
    means for holding said ratchet arm in said second position whereby said body member is moved in said first direction by said restoring means; and,
    means on said body member adjacent the first tooth of said series of teeth for engaging said ratchet arm and moving said arm from said second position to said first position to stop the motion of said body member in said first direction and to hold said body member until the next movement of said body member by said rotating means whereby said plurality of precise mechanical positions of said body member connected to said sample tray may be repeated.

6. The radiant energy analyzer of claim 5 wherein said rotating means is a Geneva movement mechanism comprising a rotating disc having a driving pin mounted thereon, said driving pin forming said protruding finger; and,
    an electric motor connected to said disc for producing rotation.

7. The radiant energy analyzer of claim 6 further including a switch by which power is supplied to said motor, said switch being opened by said driving pin to remove power from said motor at the end of each complete revolution of said disc.

8. The radiant energy analyzer as described in claim 5 wherein said restoring force means comprises a negator spring.

9. The radiant energy analyzer as described in claim 5 wherein said ratchet spring means comprises a leaf spring which normally presses upon the other end of said ratchet arm and wherein said means for holding said ratchet arm is a detent in said leaf spring, said detent accepting and holding one end of said ratchet arm when said arm is moved to said second position.

* * * * *